United States Patent
Reimer

[15] 3,656,971
[45] Apr. 18, 1972

[54] LOW DENSITY FROSTINGS

[72] Inventor: George R. Reimer, 4709 Winnetka Ave. N., Minneapolis, Minn. 55428

[22] Filed: Jan. 30, 1970

[21] Appl. No.: 7,245

[52] U.S. Cl. ...................................................99/139
[51] Int. Cl. ...................................................A23g 3/00
[58] Field of Search ......................................99/139

[56] References Cited
UNITED STATES PATENTS 3,244,536  4/1966  Kidger ...................................99/139
3,464,830  9/1969  Wahba ...................................99/139

Primary Examiner—Raymond N. Jones
Assistant Examiner—J. M. Hunter
Attorney—Anthony A. Juettner and Gene O. Enockson

[57] ABSTRACT

Dry creme frosting mix having a density of about 0.55 to 0.75 gm./cc and a lower level of sweetness than presently available frostings.

9 Claims, No Drawings

LOW DENSITY FROSTINGS

This invention relates to a dry creme frosting mix. More particularly it relates to a dry mix which produces a creme frosting having a lower density than presently available creme frostings have and a corresponding reduced level of sweetness.

One of the common complaints directed toward frostings made from presently available dry mixes is that they impart an overly rich, concentrated sweetness to the cake. The object of this invention is to produce a creme frosting from a dry mix which imparts a milder sweetness and a smoother flavor blend to the cake.

In general, creme frostings are composed of sugar, shortening, flavorings and sufficient water to form a plastic mass. Aerating and drying agents such as gelatin, agar, sodium alginate, starch, gums and pectins have been added to dry mixes to make the frostings smoother. Emulsifiers are frequently added. Heretofore, however, the density of creme frostings made from dry mixes has been in the range of about 1.00 gm./cc. This density level has been essential to maintain the integrity of the frosting as a creme and at this density level the frosting is very rich and very sweet.

It has now been found that by the use of selected shortenings and emulsifiers more air can easily be whipped into the frosting thus reducing the sweetness level while retaining the creme identity. In contrast to the 1.0 gm./cc. density of the creme frostings made from presently available dry mixes, the density of the frostings made from the dry mix of the present invention is about 0.55 to 0.75 gm./cc.

The dry mixes of the present invention are comprised basically of:

1. About 50 to 80 percent sucrose by weight of the total dry mix, a portion of which can be replaced with other saccharides such as dextrose, maltodextrin, corn syrup or mixtures thereof in amounts such that the percentage of sucrose is maintained at least at about 50 percent by weight of the dry mix, and the amount of the other saccharides does not exceed about 20 percent by weight of the dry mix,
2. About 5 to 15 percent selected shortenings by weight of the total dry mix,
3. About 0.30 to 4.75 percent mono and diglycerides of high fatty acids by weight of the total dry mix,
4. About 0.05 to 1.00 percent polyoxyethylene sorbitan fatty acid esters by weight of the total dry mix, and
5. A starch component in sufficient amounts to absorb free water in the finished frosting.

To the basic structural ingredients listed above from 0 percent up to about 15 percent other ingredients by weight of the total dry mix can be added. These other ingredients include flavorings, seasonings, colorings and bodying agents, salt, flavor powder, non-fat dried milk and cocoa.

Sucrose used in dry mixes is mainly very finely ground. In many commercially available fine ground sugars 3 to 4 percent starch is added to insure flowability during storage and use. This starch plays no part in the present invention. While sucrose can be used in amounts of about 50 to 80 percent by weight of the total dry mix, best results are obtained if the fraction is about 55 to 75 percent by weight of the total dry mix. For purposes of improving texture, smoothness and moisture retention, saccharides such as invert sugar, dextrose, corn syrup and maltodextrin can be substituted for portions of the sucrose in the dry mix. This substitution can amount to as much as about 20 percent by weight of the total dry mix while maintaining at least about 50 percent sucrose by weight of the dry mix.

The shortening ingredient can be an animal or vegetable shortening having a Wiley Melting Point (American Association of Cereal Chemists Approved Method Volume 2, Method 58–41) of from about 107° F. to 120° F. and an approximate Solid-Fat Index (Official and Tentative Methods of the American Oil Chemists Soc., Method Cd 10–57) of:

| Temperature, °F. | Approximate Solid-Fat Index |
| --- | --- |
| 50 | 23 – 38% |
| 70 | 19 – 30% |
| 80 | 17 – 27% |
| 92 | 14 – 24% |
| 104 | 9 – 19% |
| 110 | 5 – 16% |

Best results are obtained if the shortening is used in amounts of from about 7.5 to 12.5 percent by weight of the dry mix.

One preferred shortening ingredient is an animal, vegetable-based shortening having a Wiley Melting Point of from about 116° F. to 118° F. and a Solid-Fat Index of:

Shortening I

| Temperature, °F. | Solid-Fat Index |
| --- | --- |
| 50 | 26 – 32% |
| 70 | 21 – 27% |
| 80 | 19 – 25% |
| 92 | 16 – 21% |
| 104 | 12 – 17% |
| 110 | 7 – 13% |

This shortening was used in Example I and contains 2.85 percent ± 0.25 percent monoglycerides of higher fatty acids derived from hydrogenated corn oil and measured as stearates by weight of the shortening and 0.8 percent polyoxyethylene sorbitan stearate by weight of the shortening. The shortenings useful in this invention need not contain emulsifiers, but if they do contain monoglycerides, diglycerides or polyoxyethylene sorbitan esters of higher fatty acids, the amount of these emulsifiers should be calculated as part of the total emulsifiers in the system.

Another preferred shortening ingredient is a rearranged lard with or without added beef tallow and with or without added vegetable oil, having a Wiley Melting Point of from about 115° F. to 120° F. and a Solid-Fat Index of:

Shortening II

| Temperature, °F. | Solid-Fat Index |
| --- | --- |
| 50 | 34.0 – 37.0% |
| 70 | 25.0 – 28.0% |
| 80 | 23.5 – 26.5% |
| 92 | 19.0 – 22.0% |
| 104 | 11.0 – 14.0% |

This shortening contains monoglycerides derived from hydrogenated corn oil and measured as stearates in amounts of about 2.8 to 3.3 percent by weight of the shortening. This shortening was used in Example II.

Still a third illustrative shortening ingredient is an animal and vegetable based shortening which contains all the emulsifiers used in the frosting system. This shortening has a Wiley Melting Point of 107° F. to 111° F. and a Solid-Fat Index of:

Shortening III

| Temperature, °F. | Solid-Fat Index |
| --- | --- |
| 50 | 36 – 38% |
| 70 | 26 – 30% |
| 92 | 20 – 24% |
| 104 | 14 – 16% |

This shortening contained 2.5 percent mono and diglycerides of higher fatty acids derived from vegetable oil by weight of the shortening and 0.5 percent polyoxyethylene sorbitan stearate by weight of the shortening.

In the mixture of mono and diglycerides of higher fatty acids in the dry mix, whether introduced in the shortening or separately, the monoglycerides preferably constitute about 35 to 50 percent by weight of the glyceride mixture and the diglycerides about 50 to about 65 percent by weight of the glyceride mixture. Mono and diglycerides of a variety of higher fatty acids derived from corn oil, peanut oil, coconut oil and other vegetable oils are available and can be used as components of this glyceride mixture. These higher fatty acids contain from about 16 to 18 carbon groups in the fatty acid chain. The preferred mono and diglycerides are those of stearic and palmitic acid.

The polyoxyethylene sorbitan esters of higher fatty acids useful in this invention are those having about 16 to 18 carbon atoms in the fatty acid chain. Included in this group are polyoxyethylene sorbitan esters of oleic and stearic acids. Polyoxyethylene sorbitan stearate is the preferred component as its taste contribution to the composition is less than that of oleic acid derivatives. The polyoxyethylene sorbitan esters preferably contain an average of about 20 oxyethylene groups per molecule.

In order to introduce the mono and diglycerides and the polyoxyethylene sorbitan esters of higher fatty acids into a dry mix, the emulsifiers are generally first incorporated into the shortening as illustrated in Example III using Shortening III or mixed with a carrier and spray dried as illustrated in Examples I, II and IV. One such spray dried mixture has the following composition:

Emulsifier and Carrier Composition I

| Component | Percentage by Weight |
|---|---|
| Non-fat Dry Milk | 35% |
| Mono and diglycerides | 31% |
| Shortening | 15% |
| Sugar | 10% |
| Pregelatinized Wheat Starch | 5% |
| Polyoxyethylene Sorbitan Stearate | 4% |

Another suitable spray dried composition is:

Emulsifier and Carrier Composition II

| Component | Percentage by Weight |
|---|---|
| Mono and diglycerides | 31% |
| Non-fat Dry Milk | 28% |
| Sorbitan monostearate | 13% |
| Shortening | 13% |
| Sugar | 8% |
| Starch | 4% |
| Polyoxyethylene Sorbitan Stearate | 3% |

Best results were obtained when these compositions were used in amounts of from about 3 to 15 percent by weight of the dry mix.

The starch component can be either a natural starch or a pregelatinized starch. Natural starch can be used in amounts of from about 5 to 12 percent by weight of the dry mix. Pregelatinized starch can be used in amounts of from about 0.5 to 1.0 percent by weight of the total dry mix. Due to its reduced contribution to flavor and mouthfeel in the final product, the use of pregelatinized starch is preferred.

A wide variety of pregelatinized starches can be used in dry mix formulations encompassed by this invention. Illustrative pregelatinized starches include: waxy maize, wheat, cereal corn, tapioca and potato starches. The selection of the starch will influence the mouthfeel and texture of the finished frosting. The selection, therefore, is governed by the mouthfeel and texture desired in the particular frosting being produced.

One of the pregelatinized starches which I have found especially satisfactory is a pregelatinized, cross-linked waxy maize starch having a granulation of 95 percent through a No. 100 U. S. standard sieve, a pH of 5.2 to 6.6 and a viscosity of 4,500 to 6,500 centipoise measured with a Brookfield Viscometer after dispersing 40 grams of the pregelatinized starch in 60 ml. of methyl alcohol, adding 440 ml. of phosphate buffer solution to produce a pH of 6.0 ± 0.05 and mixing for a total time of 5 minutes.

The ingredients of the dry mix can be combined using the following procedure. The dry ingredients are screened to remove lumps. The sifted dry ingredients are blended together in a ribbon blender or other suitable mixer until the mixture is uniform. The temperature of the uniform mixture is then adjusted to a range of 70° to 75° F. After the temperature of the mixture is adjusted and with continued mixing, the shortening, held at a temperature of 70° to 75° F., is extruded into the mixture. Mixing is continued after extrusion until the shortening has been uniformly distributed through the mixture. The mixture is then passed through a finisher to remove any lumps.

Described below are the ingredients, mixing procedure, preparation methods and end results of specific embodiments of this invention:

EXAMPLE I

This example illustrates a typical dry creme frosting mix of this invention. The formulation of the dry mix is as follows:

| Ingredients | Percent by Weight of Dry Mix |
|---|---|
| Sucrose (including 4% wheat starch) | 58.15% |
| Dextrose (Cerelose 2043, Corn Products Refining Company) | 10.00% |
| Shortening (Diamond D-65, Durkee Famous Foods) Shortening I described above | 10.00% |
| Spray Dried Emulsifier Mix (Composition I described above) | 7.00% |
| Cocoa (10/12 Red Dutched) | 6.00% |
| Maltodextrin (Frodex 24, American Maize Co.) | 5.00% |
| Non-fat Milk Solids | 1.00% |
| Pregelatinized Starch (Instant Clearjel, National Starch and Chemical Co.) | 0.75% |
| Caramel Flavor | 0.50% |
| Fudge Powder, imitation | 0.50% |
| Salt, fine flour | 0.50% |
| Vanilla Powder, imitation | 0.50% |
| Color | 0.10% |
| | Total: 100.00% |

The ingredients were combined to form the dry mix by the procedure described above.

The finished frosting was prepared by combining 9.5 ounces of the dry mix with three tablespoons soft butter and ⅓ cup water and mixing the ingredients with a kitchen mixer at high speed for a period of five minutes. The density of the finished frosting was 0.6 gm./cc. with good flavor and texture. The volume was enough to frost two 9-inch layers of cake.

EXAMPLE II

This example illustrates the use of a shortening which does not contain polyoxyethylene sorbitan stearate. Shortening II described in the specification was used in the formulation shown in Example I. The resulting frosting had a density of 0.71 gm./cc. with good flavor and texture.

EXAMPLE III

This example illustrates a method of introducing all of the mono and diglycerides and polyoxyethylene sorbitan stearate by way of the shortening rather than in spray dried compositions.

The formulation of the frosting was:

| Ingredients | Percent by Weight of Dry Mix | |
|---|---|---|
| | Frosting 1 | Frosting 2 |
| Sucrose (including 4% wheat starch) | 63.15% | 61.15% |
| Dextrose (Cerelose 2043, Corn Products Refining Co.) | 10.00% | 10.00% |
| Shortening (Morvol, Armour) Shortening III described above | 12.00% | 14.00% |
| Cocoa (10/12 Red Dutched) | 6.00% | 6.00% |
| Maltodextrin (Frodex 24, American Maize Co.) | 5.00% | 5.00% |
| Non-fat Milk Solids | 1.00% | 1.00% |
| Pregelatinized Starch (Instant Clearjel, National Starch and Chemical Co.) | 0.75% | 0.75% |
| Caramel Flavor | 0.50% | 0.50% |
| Fudge Powder, imitation | 0.50% | 0.50% |
| Salt, fine flour | 0.50% | 0.50% |
| Vanilla Powder, imitation | 0.50% | 0.50% |
| Color | 0.10% | 0.10% |
| Totals: | 100.00% | 100.00% |

The dry mix was formulated as described above.

The finished frostings were prepared by combining 10 ounces of the dry mix with three tablespoons of butter and ¼ cup water and mixing the ingredients with a kitchen mixer at high speed for a period of 5 minutes. The densities of the above frostings were 0.76 gm./cc. with good flavor and texture.

EXAMPLE IV

This example illustrates the use of still another spray dried emulsifier combination. The formulation of the dry creme frosting mix is as follows:

| Ingredients | Percent By Weight of Dry Mix | | |
|---|---|---|---|
| | Frosting 1 | Frosting 2 | Frosting 3 |
| Sucrose (including 4% wheat starch) | 60.65% | 58.15% | 57.15% |
| Dextrose (Cerelose 2043 Corn Products Refining Co.) | 10.00% | 10.00% | 10.00% |
| Shortening I (Diamond D-65 Durkee Famous Foods) described above | 10.00% | 10.00% | 10.00% |
| Spray Dried Emulsifier Mix Composition 2 described above | 4.50% | 7.00% | 8.00% |
| Cocoa (10/12 Red Dutched) | 6.00% | 6.00% | 6.00% |
| Maltodextrin (Frodex 24, American Maize Co.) | 5.00% | 5.00% | 5.00% |
| Non-fat Milk Solids | 1.00% | 1.00% | 1.00% |
| Pregelatinized Starch (Instant Clearjel, National Starch and Chemical Co.) | 0.75% | 0.75% | 0.75% |
| Caramel Flavor | 0.50% | 0.50% | 0.50% |
| Fudge Powder, imitation | 0.50% | 0.50% | 0.50% |
| Salt, fine flour | 0.50% | 0.50% | 0.50% |
| Vanilla Powder, imitation | 0.50% | 0.50% | 0.50% |
| Color | 0.10% | 0.10% | 0.10% |
| Totals: | 100.00% | 100.00% | 100.00% |

The ingredients were combined to form the dry mixes as described above. The finished frostings were prepared as in Example II. The densities of Frostings 1, 2 and 3 were 0.69 gm./cc., 0.58gm./cc. and 0.57gm./cc., respectively with good flavor and texture.

As can readily be appreciated, many variations using the basic formulations of the dry mixes of this invention can be made.

I claim
1. A dry creme frosting mix comprising:
about 50 percent to 80 percent sucrose by weight of the dry mix;
about 5 percent to 15 percent shortening by weight of the dry mix said shortening having a Wiley Melting Point of from about 107° F. to 120° F. and an approximate Solid-Fat Index of:

| Temperature, °F. | Solid-Fat Index |
|---|---|
| 50 | 23 – 38% |
| 70 | 19 – 30% |
| 80 | 17 – 27% |
| 92 | 14 – 24% |
| 104 | 9 – 19% |
| 110 | 5 – 16% | about 0.3 to 4.75 percent mono and diglycerides of high fatty acids by weight of the dry mix;
about 0.05 to 1.00 percent polyoxyethylene sorbitan fatty acid ester by weight of the dry mix; and
a starch component in sufficient amount to absorb free water in a finished frosting and selected from the group consisting of about 5 to 12 percent natural starch and about 0.5 to 1 percent pregelatinized starch by weight of the dry mix.
2. A dry creme frosting mix comprising:
about 50 to 80 percent sucrose by weight of the dry mix;
about 5 to 15 percent shortening by weight of the dry mix said shortening having a Wiley Melting Point of from about 107° F. to 120° F. and an approximate Solid-Fat Index of:

| Temperature, °F. | Solid-Fat Index |
|---|---|
| 50 | 23 – 38% |
| 70 | 19 – 30% |
| 80 | 17 – 27% |
| 92 | 14 – 24% |
| 104 | 9 – 19% |
| 110 | 5 – 16% | about 0.30 to 4.75 percent mono and diglycerides of high fatty acids by weight of the dry mix;
about 0.05 to 1.00 percent polyoxyethylene sorbitan fatty acid ester by weight of the dry mix; and
about 5 to 12 percent natural starch by weight of the dry mix.
3. A dry creme frosting mix comprising:
about 50 to 80 percent sucrose by weight of the dry mix;
about 5 to 15 percent shortening by weight of the dry mix said shortening having a Wiley Melting Point of from about 107° F. to 120° F. and an approximate Solid-Fat Index of:

| Temperature, °F. | Solid-Fat Index |
|---|---|
| 50 | 23 – 38% |
| 70 | 19 14 30% |
| 80 | 17 – 27% |
| 92 | 14 – 24% |
| 104 | 9 – 19% |
| 110 | 5 – 16% | about 0.30 to 4.75 percent mono and diglycerides of high fatty acids by weight of the dry mix;
about 0.05 to 1.00 percent polyoxyethylene sorbitan fatty acid ester by weight of the dry mix; and
about 0.5 to 1.0 percent pregelatinized starch by weight of the dry mix.
4. The dry creme frosting mix as recited in claim 1 wherein the polyoxyethylene sorbitan fatty acid ester is polyoxyethylene sorbitan stearate. diglycerides of
5. The dry creme frosting mix as recited in claim 1 wherein the mono and diglycerides of high fatty acids are in the proportions of about 35 to 50 percent monoglycerides of high fatty acids by weight of the combined mono and diglycerides and about 50 to 65 percent diglycerides of high fatty acids by weight of the combined mono and diglyceridesof high fatty acids.
6. The dry creme frosting mix as recited in claim 5 wherein the mono and diglycerides of high fatty acids are mono and diglycerides of palmitic or stearic acid.
7. The dry creme frosting mix as recited in claim 1 wherein said sucrose is present in amounts of about 55 to 75 percent by weight of the dry mix.
8. The dry creme frosting mix as recited in claim 1 wherein said shortening is present in amounts of about 7.5 to 12.5 percent by weight of the dry mix.
9. A dry creme frosting mix comprising:
about 55 to 75 percent sucrose by weight of the dry mix;
about 7.5 to 12.5 percent shortening by weight of the dry mix said shortening having a Wiley Melting Point of from about 107° F. to 120° F. and an approximate Solid-fat Index of:

| Temperature, °F. | Solid-Fat Index |
|---|---|
| 50 | 23 – 38% |
| 70 | 19 – 30% |
| 80 | 17 – 27% |
| 92 | 14 – 24% |
| 104 | – 19% |
| 110 | 5 – 16% | about 0.30 to 4.75 percent mono and diglycerides of palmitic or stearic acid, said monoglycerides constituting about 35 to 50 percent of the combined weight of said mono and diglycerides;

about 0.05 to 1.00 percent polyoxyethylene sorbitan stearate by weight of the dry mix; and about 0.5 to 1.0 percent pregelatinized starch by weight of the dry mix.

* * * * *

UNITED STATES PATENT OFFICE
CERTIFICATE OF CORRECTION

Patent No. 3,656,971                    Dated  April 18, 1972

Inventor(s) George R. Reimer                              -1-

It is certified that error appears in the above-identified patent and that said Letters Patent are hereby corrected as shown below:

In the grant only, insert columns 1 through 4, as shown by the attached sheets.

Signed and sealed this 26th day of December 1972.

(SEAL)
Attest:

EDWARD M. FLETCHER, JR.                ROBERT GOTTSCHALK
Attesting Officer                      Commissioner of Patents Patent No. 3,656,971  Dated April 18, 1972
Inventor George R. Reimer
--2--

LOW DENSITY FROSTINGS

This invention relates to a dry creme frosting mix. More particularly it relates to a dry mix which produces a creme frosting having a lower density than presently available creme frostings have and a corresponding reduced level of sweetness.

One of the common complaints directed toward frostings made from presently available dry mixes is that they impart an overly rich, concentrated sweetness to the cake. The object of this invention is to produce a creme frosting from a dry mix which imparts a milder sweetness and a smoother flavor blend to the cake.

In general, creme frostings are composed of sugar, shortening, flavorings and sufficient water to form a plastic mass. Aerating and drying agents such as gelatin, agar, sodium alginate, starch, gums and pectins have been added to dry mixes to make the frostings smoother. Emulsifiers are frequently added. Heretofore, however, the density of creme frostings made from dry mixes has been in the range of about 1.00 gm./cc. This density level has been essential to maintain the integrity of the frosting as a creme and at this density level the frosting is very rich and very sweet.

It has now been found that by the use of selected shortenings and emulsifiers more air can easily be whipped into the frosting thus reducing the sweetness level while retaining the creme identity. In contrast to the 1.0 gm./cc. density of the creme frostings made from presently available dry mixes, the density of the frostings made from the dry mix of the present invention is about 0.55 to 0.75 gm./cc.

The dry mixes of the present invention are comprised basically of:

1. About 50 to 80 percent sucrose by weight of the total dry mix, a portion of which can be replaced with other saccharides such as dextrose, maltodextrin, corn syrup or mixtures thereof in amounts such that the percentage of sucrose is maintained at least at about 50 percent by weight of the dry mix, and the amount of the other saccharides does not exceed about 20 percent by weight of the dry mix, 2. About 5 to 15 percent selected shortenings by weight of the total dry mix, 3. About 0.30 to 4.75 percent mono and diglycerides of high fatty acids by weight of the total dry mix, 4. About 0.05 to 1.00 percent polyoxyethylene sorbitan fatty acid esters by weight of the total dry mix, and 5. A starch component in sufficient amounts to absorb free water in the finished frosting.

To the basic structural ingredients listed above from 0 percent up to about 15 percent other ingredients by weight of the total dry mix can be added. These other ingredients include flavorings, seasonings, colorings and bodying agents, salt, flavor powder, non-fat dried milk and cocoa.

Sucrose used in dry mixes is mainly very finely ground. In many commercially available fine ground sugars 3 to 4 percent starch is added to insure flowability during storage and use. This starch plays no part in the present invention. While sucrose can be used in amounts of about 50 to 80 percent by weight of the total dry mix, best results are obtained if the fraction is about 55 to 75 percent by weight of the total dry mix. For purposes of improving texture, smoothness and moisture retention, saccharides such as invert sugar, dextrose, corn syrup and maltodextrin can be substituted for portions of the sucrose in the dry mix. This substitution can amount to as much as about 20 percent by weight of the total dry mix while maintaining at least about 50 percent sucrose by weight of the dry mix.

The shortening ingredient can be an animal or vegetable shortening having a Wiley Melting Point (American Association of Cereal Chemists Approved Method Volume 2, Method 58–41) of from about 107° F. to 120° F. and an approximate Solid-Fat Index (Official and Tentative Methods of the American Oil Chemists Soc., Method Cd 10–57) of:

| Temperature, °F. | Approximate Solid-Fat Index |
|---|---|
| 50 | 23 – 38% |
| 70 | 19 – 30% |
| 80 | 17 – 27% |
| 92 | 14 – 24% |
| 104 | 9 – 19% |
| 110 | 5 – 16% |

Best results are obtained if the shortening is used in amounts of from about 7.5 to 12.5 percent by weight of the dry mix.

One preferred shortening ingredient is an animal, vegetable-based shortening having a Wiley Melting Point of from about 116° F. to 118° F. and a Solid-Fat Index of:

Shortening I

| Temperature, °F. | Solid-Fat Index |
|---|---|
| 50 | 26 – 32% |
| 70 | 21 – 27% |
| 80 | 19 – 25% |
| 92 | 16 – 21% |
| 104 | 12 – 17% |
| 110 | 7 – 13% |

This shortening was used in Example I and contains 2.85 percent ± 0.25 percent monoglycerides of higher fatty acids derived from hydrogenated corn oil and measured as stearates by weight of the shortening and 0.8 percent polyoxyethylene sorbitan stearate by weight of the shortening. The shortenings useful in this invention need not contain emulsifiers, but if they do contain monoglycerides, diglycerides or polyoxyethylene sorbitan esters of higher fatty acids, the amount of these emulsifiers should be calculated as part of the total emulsifiers in the system.

Another preferred shortening ingredient is a rearranged lard with or without added beef tallow and with or without added vegetable oil, having a Wiley Melting Point of from about 115° F. to 120° F. and a Solid-Fat Index of:

Shortening II

| Temperature, °F. | Solid-Fat Index |
|---|---|
| 50 | 34.0 – 37.0% |
| 70 | 25.0 – 28.0% |
| 80 | 23.5 – 26.5% |
| 92 | 19.0 – 22.0% |
| 104 | 11.0 – 14.0% |

This shortening contains monoglycerides derived from hydrogenated corn oil and measured as stearates in amounts of about 2.8 to 3.3 percent by weight of the shortening. This shortening was used in Example II.

Still a third illustrative shortening ingredient is an animal and vegetable based shortening which contains all the emulsifiers used in the frosting system. This shortening has a Wiley Melting Point of 107° F. to 111° F. and a Solid-Fat Index of:

Shortening III

| Temperature, °F. | Solid-Fat Index |
|---|---|
| 50 | 36 – 38% |
| 70 | 26 – 30% |
| 92 | 20 – 24% |
| 104 | 14 – 16% |

This shortening contained 2.5 percent mono and diglycerides of higher fatty acids derived from vegetable oil by weight of the shortening and 0.5 percent polyoxyethylene sorbitan stearate by weight of the shortening.

In the mixture of mono and diglycerides of higher fatty acids in the dry mix, whether introduced in the shortening or separately, the monoglycerides preferably constitute about 35 to 50 percent by weight of the glyceride mixture and the diglycerides about 50 to about 65 percent by weight of the glyceride mixture. Mono and diglycerides of a variety of higher fatty acids derived from corn oil, peanut oil, coconut oil and other vegetable oils are available and can be used as components of this glyceride mixture. These higher fatty acids contain from about 16 to 18 carbon groups in the fatty acid chain. The preferred mono and diglycerides are those of stearic and palmitic acid.

The polyoxyethylene sorbitan esters of higher fatty acids useful in this invention are those having about 16 to 18 carbon atoms in the fatty acid chain. Included in this group are polyoxyethylene sorbitan esters of oleic and stearic acids. Polyoxyethylene sorbitan stearate is the preferred component as its taste contribution to the composition is less than that of oleic acid derivatives. The polyoxyethylene sorbitan esters preferably contain an average of about 20 oxyethylene groups per molecule.

In order to introduce the mono and diglycerides and the polyoxyethylene sorbitan esters of higher fatty acids into a dry mix, the emulsifiers are generally first incorporated into the shortening as illustrated in Example III using Shortening III or mixed with a carrier and spray dried as illustrated in Examples I, II and IV. One such spray dried mixture has the following composition:

Emulsifier and Carrier Composition I

| Component | Percentage by Weight |
|---|---|
| Non-fat Dry Milk | 35% |
| Mono and diglycerides | 31% |
| Shortening | 15% |
| Sugar | 10% |
| Pregelatinized Wheat Starch | 5% |
| Polyoxyethylene Sorbitan Stearate | 4% |

Another suitable spray dried composition is:

Emulsifier and Carrier Composition II

| Component | Percentage by Weight |
|---|---|
| Mono and diglycerides | 31% |
| Non-fat Dry Milk | 28% |
| Sorbitan monostearate | 13% |
| Shortening | 13% |
| Sugar | 8% |
| Starch | 4% |
| Polyoxyethylene Sorbitan Stearate | 3% |

Best results were obtained when these compositions were used in amounts of from about 3 to 15 percent by weight of the dry mix.

The starch component can be either a natural starch or a pregelatinized starch. Natural starch can be used in amounts of from about 5 to 12 percent by weight of the dry mix. Pregelatinized starch can be used in amounts of from about 0.5 to 1.0 percent by weight of the total dry mix. Due to its reduced contribution to flavor and mouthfeel in the final product, the use of pregelatinized starch is preferred.

A wide variety of pregelatinized starches can be used in dry mix formulations encompassed by this invention. Illustrative pregelatinized starches include: waxy maize, wheat, cereal corn, tapioca and potato starches. The selection of the starch will influence the mouthfeel and texture of the finished frosting. The selection, therefore, is governed by the mouthfeel and texture desired in the particular frosting being produced.

One of the pregelatinized starches which I have found especially satisfactory is a pregelatinized, cross-linked waxy maize starch having a granulation of 95 percent through a No. 100 U. S. standard sieve, a pH of 5.2 to 6.6 and a viscosity of 4,500 to 6,500 centipoise measured with a Brookfield Viscometer after dispersing 40 grams of the pregelatinized starch in 60 ml. of methyl alcohol, adding 440 ml. of phosphate buffer solution to produce a pH of 6.0 ± 0.05 and mixing for a total time of 5 minutes.

The ingredients of the dry mix can be combined using the following procedure. The dry ingredients are screened to remove lumps. The sifted dry ingredients are blended together in a ribbon blender or other suitable mixer until the mixture is uniform. The temperature of the uniform mixture is then adjusted to a range of 70° to 75° F. After the temperature of the mixture is adjusted and with continued mixing, the shortening, held at a temperature of 70° to 75° F., is extruded into the mixture. Mixing is continued after extrusion until the shortening has been uniformly distributed through the mixture. The mixture is then passed through a finisher to remove any lumps.

Described below are the ingredients, mixing procedure, preparation methods and end results of specific embodiments of this invention:

EXAMPLE I

This example illustrates a typical dry creme frosting mix of this invention. The formulation of the dry mix is as follows:

| Ingredients | Percent by Weight of Dry Mix |
|---|---|
| Sucrose (including 4% wheat starch) | 58.15% |
| Dextrose (Cerelose 2043, Corn Products Refining Company) | 10.00% |
| Shortening (Diamond D–65, Durkee Famous Foods) Shortening I described above | 10.00% |
| Spray Dried Emulsifier Mix (Composition I described above) | 7.00% |
| Cocoa (10/12 Red Dutched) | 6.00% |
| Maltodextrin (Frodex 24, American Maize Co.) | 5.00% |
| Non-fat Milk Solids | 1.00% |
| Pregelatinized Starch (Instant Clearjel, National Starch and Chemical Co.) | 0.75% |
| Caramel Flavor | 0.50% |
| Fudge Powder, imitation | 0.50% |
| Salt, fine flour | 0.50% |
| Vanilla Powder, imitation | 0.50% |
| Color | 0.10% |
| Total: | 100.00% |

The ingredients were combined to form the dry mix by the procedure described above.

The finished frosting was prepared by combining 9.5 ounces of the dry mix with three tablespoons soft butter and ⅓ cup water and mixing the ingredients with a kitchen mixer at high speed for a period of five minutes. The density of the finished frosting was 0.6 gm./cc. with good flavor and texture. The volume was enough to frost two 9-inch layers of cake.

EXAMPLE II

This example illustrates the use of a shortening which does not contain polyoxyethylene sorbitan stearate. Shortening II described in the specification was used in the formulation shown in Example I. The resulting frosting had a density of 0.71 gm./cc. with good flavor and texture.

EXAMPLE III

This example illustrates a method of introducing all of the mono and diglycerides and polyoxyethylene sorbitan stearate by way of the shortening rather than in spray dried compositions.

The formulation of the frosting was:

| Ingredients | Percent by Weight of Dry Mix | |
|---|---|---|
| | Frosting 1 | Frosting 2 |
| Sucrose (including 4% wheat starch) | 63.15% | 61.15% |
| Dextrose (Cerelose 2043, Corn Products Refining Co.) | 10.00% | 10.00% |
| Shortening (Morvol, Armour) Shortening III described above | 12.00% | 14.00% |
| Cocoa (10/12 Red Dutched) | 6.00% | 6.00% |
| Maltodextrin (Frodex 24, American Maize Co.) | 5.00% | 5.00% |
| Non-fat Milk Solids | 1.00% | 1.00% |
| Pregelatinized Starch (Instant Clearjel, National Starch and Chemical Co.) | 0.75% | 0.75% |
| Caramel Flavor | 0.50% | 0.50% |
| Fudge Powder, imitation | 0.50% | 0.50% |
| Salt, fine flour | 0.50% | 0.50% |
| Vanilla Powder, imitation | 0.50% | 0.50% |
| Color | 0.10% | 0.10% |
| Totals: | 100.00% | 100.00% |

The dry mix was formulated as described above.

The finished frostings were prepared by combining 10 ounces of the dry mix with three tablespoons of butter and ¼

PO-1050
(5/69)

UNITED STATES PATENT OFFICE
CERTIFICATE OF CORRECTION

Patent No. 3,656,971      Dated April 18, 1972

Inventor(s) George R. Reimer

It is certified that error appears in the above-identified patent and that said Letters Patent are hereby corrected as shown below:

Column 6, line 28 of the table, "19 14 30%" should read -- 19-30% --; line 41, "stearate. diglycerides of" should read -- stearate. --; line 47, "diglyceridesof" should read -- diglycerides of --; line 70 of the table, "-19%" should read -- 9-19% --.

Signed and sealed this 27th day of March 1973.

(SEAL)
Attest:

EDWARD M. FLETCHER, JR.      ROBERT GOTTSCHALK
Attesting Officer      Commissioner of Patents